United States Patent Office 2,768,447
Patented Oct. 30, 1956

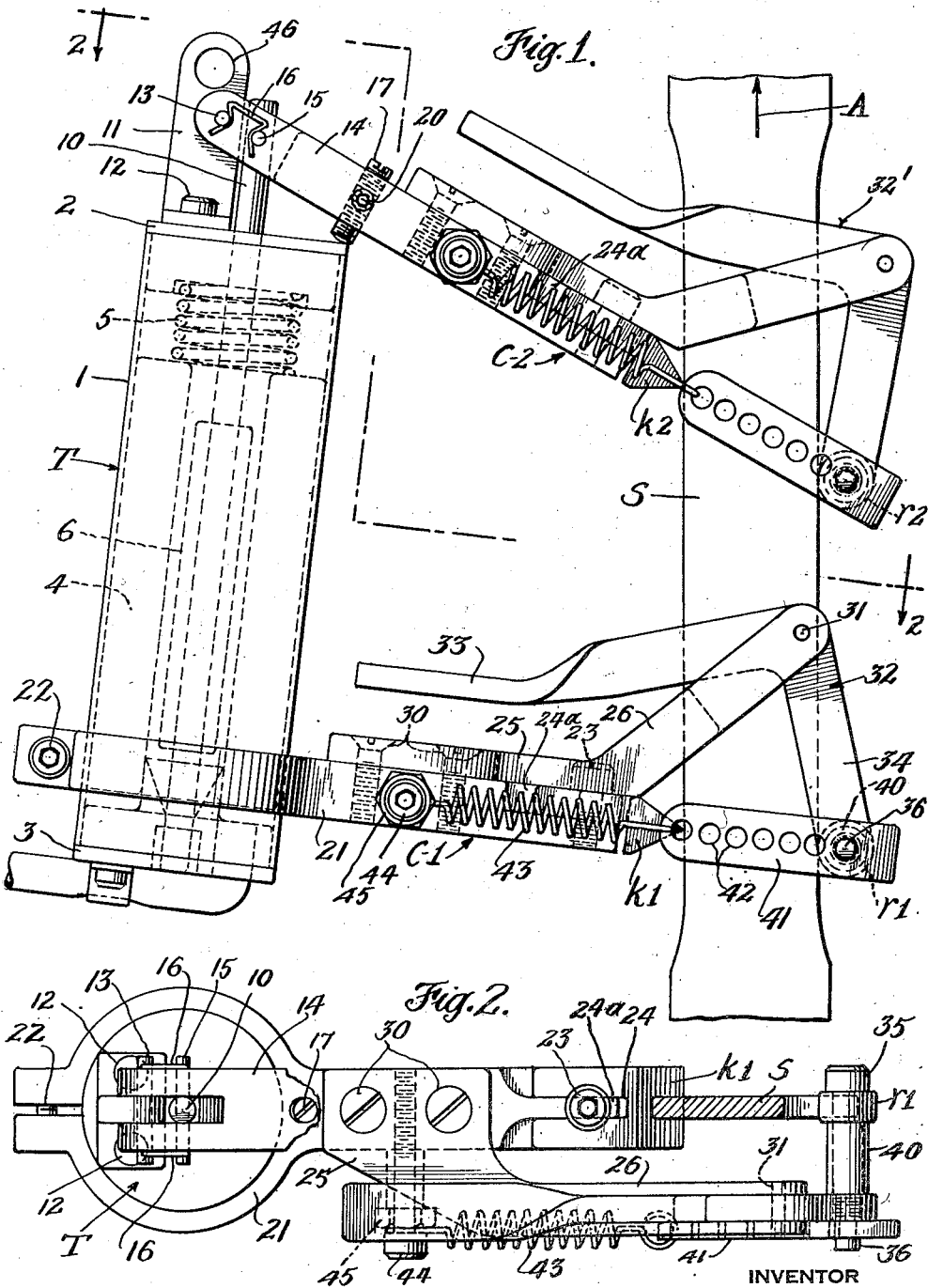

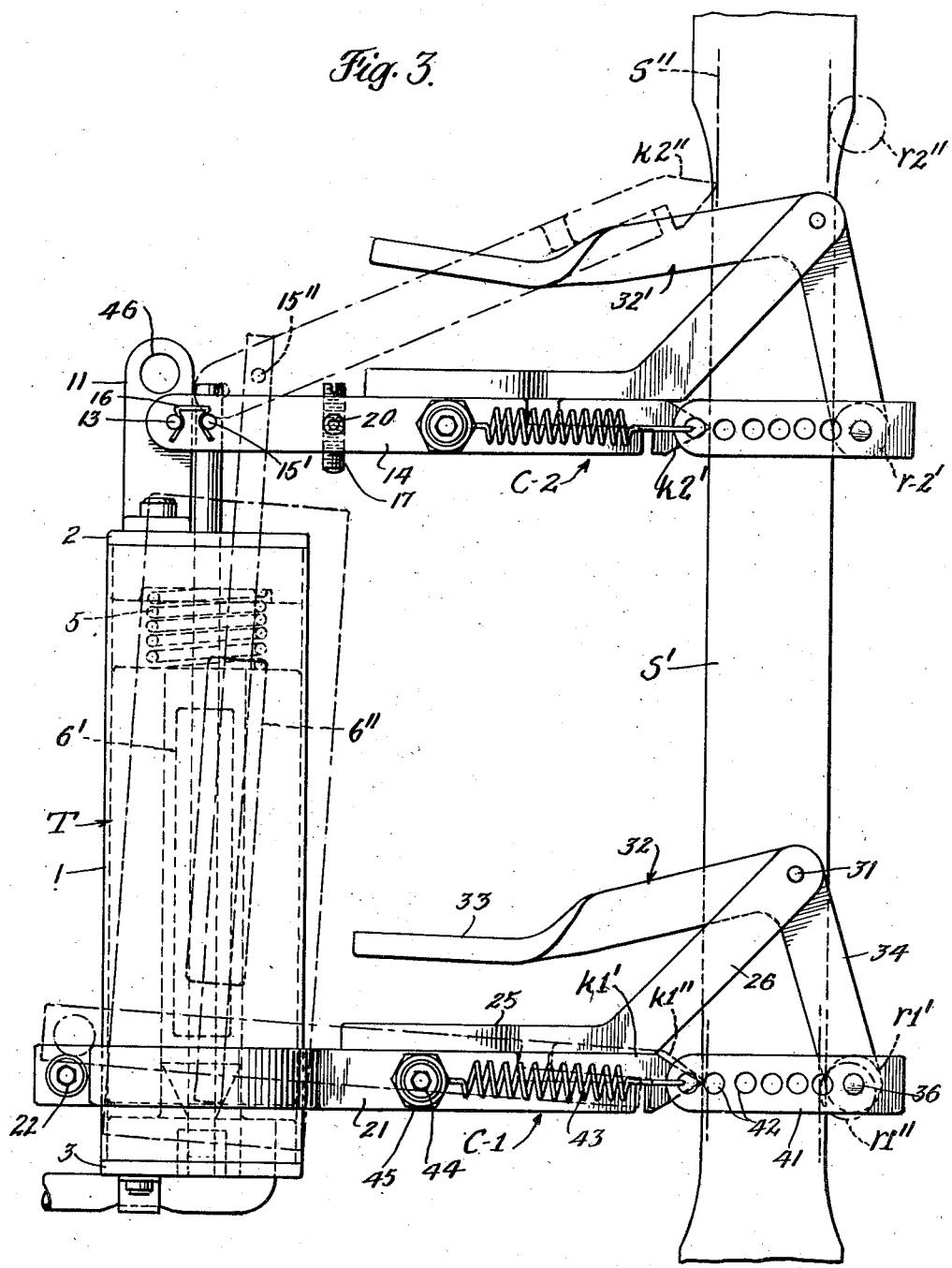

2,768,447

STRAIN MEASURING INSTRUMENT

Robert S. Strimel, Penllyn, Pa., assignor to Tinius Olsen Testing Machine Company, Willow Grove, Pa., a corporation of Pennsylvania Application August 29, 1955, Serial No. 531,141

6 Claims. (Cl. 33—148)

This invention relates to materials testing equipment and, in particular, relates to instrumentation for measuring the elongation or strain of a specimen to be tested in tension.

In the tension testing of a specimen of metal or plastic or the like, the specimen is secured in grips between the crossheads of a testing machine and strained by causing one crosshead to move relative to the other. The present invention is concerned with an instrument to be clamped on the specimen and operative to automatically measure the strain and to provide an electrical signal for apparatus to record the same, for example, a recorder as disclosed in my copending application, Serial No. 261,239, filed December 12, 1951, and entitled Recording Device for Use in Conjunction with Testing Machines. An instrument of the kind in question is commonly called an "extensometer" in the art.

One object of the invention is to provide an extensometer including means to clamp the device on the specimen to be strained, the clamping means arranged so as not to impose any extraneous load on the specimen during the straining.

Another object of the invention is to provide in an extensometer, specimen-clamping means adapted to follow the elongation of a specimen including a knife edge and a roller cooperating with the specimen and arranged to lie in substantially the same plane during elongation.

Another object of the invention is to provide in an extensometer, specimen-clamping means including a knife edge and a roller adapted to firmly press the edge against the specimen, together with spring means adjustable for positioning the roller for accommodating specimens of different sizes and for obtaining various roller pressures with different adjustments.

Another object of the invention is to provide in an extensometer, a pair of specimen-clamping means adapted to follow the elongation of a specimen to measure the amount of strain and each having a roller and a knife edge and adapted to be disposed with respect to the specimen so as to measure in an averaging or non-averaging manner.

The foregoing objects, together with other objects and features of the invention will be apparent from the following description and drawings wherein:

Figure 1 is an elevational view of an extensometer of the invention showing the manner in which the instrument is clamped on a specimen at the start of a test;

Figure 2 is a view taken along the lines 2—2 of Figure 1; and

Figure 3 is a view showing the position of various components of the instrument during the straining or elongation of the specimen.

In general, the invention includes an electrical sensing element T which is adapted to be secured to a specimen S by means of the clamping units C-1 and C-2. The sensing unit T preferably is a differential transformer having coil and core elements. As the specimen S is elongated under stress, the clamping units move relatively apart from one another as will be seen by comparing Figures 1 and 3. This relative motion of the clamps follows the strain or elongation and causes a corresponding relative movement between the coil and core elements in the sensing unit whereby an electrical signal proportional to strain is developed which may be used in the recording apparatus of my copending application mentioned above.

As seen in Figure 1, the sensing unit T has a cylindrically-shaped housing 1 provided with top and bottom end caps 2 and 3 suitably secured in the housing as by set screws (not shown). As mentioned above, the sensing unit is preferably a differential transformer and its coils 4 rest on the bottom end cap 3 and a spring 5 interposed between the top end cap 2 and the coils holds the same in desired position. The core 6 of the transformer is mounted on a rod 10 and in the position shown in Figure 1, it will be noted that the rod extends through both end caps by way of suitable apertures provided therein.

On the top of end cap 2 is a support which may be fixed to the cap as by screws 12. The support 11 carries a pivot 13, to which is connected the mounting bar 14 of the clamp C-2. The mounting bar 14 carries a pivot 15 which supports the core rod 10. A pair of springs 16—16 are interposed between the pivots 13 and 15 and function to take out any play therein. The mounting bar 14 carries an adjusting screw 17 which may be locked in position in the bar by the set screw 20. The purpose of this screw will be explained hereinafter. It will be apparent that if the mounting bar 14 is moved about its pivot 13 the rod 10 will be moved and therefore the core 6 will move relative to the coils 4.

As best seen in Figure 2, the mounting bar 21 of the clamping unit C-1 has a yoke-shaped portion which surrounds the housing 1 and the screw 22 locks the bar in place. By properly manipulating the screw 22, the bar may be vertically adjusted to some desired position and then locked in place.

The structure of each of the clamping units not yet described is essentially identical and, therefore, the explanation will be mainly in connection with clamp C-1.

The mounting bar 21 has a knife edge k-1 secured thereto by the screw 23. The knife edge is provided with a slot 24 which fits tongue 24a of the mounting bar. This arrangemment provides for the edge to be adjusted on the bar. A similarly adjustable knife edge k-2 is secured to the mounting bar 14 in the clamping unit C-2.

The bar 21 carries a bracket 25 having a portion 26 which extends generally in an upward direction and is spaced from the bar (see Figure 2). The bracket is adapted to be secured to the bar by the screws 30—30. The portion 26 is yoke-shaped and carries near its upper end a pivot 31 which mounts an L-shaped lever arm 32. The leg 33 of the lever arm extends back toward the bar 21. The other leg 34 extends downwardly and at its lower end has a screw 35 threaded in the arm. The end of the screw 35 projects outwardly from the lever and forms a stud 36. The screw carries a spacer 40 and between the spacer and the head of the screw is a roller r-1. From an inspection of Figure 1, it will be seen that the above-described mounting arrangement provides for the axis of the roller and the tip of the knife edge k-1 to lie in substantially the same plane. A similarly arranged lever 32' and roller r-2 are provided for the upper clamp.

An adjusting plate 41 has a plurality of apertures 42—42, all of which are adapted to fit over the stud 36, and in the position shown, the plate is mounted on the stud by means of the aperture farthermost to the right. The aperture farthermost to the left carries one end of a spring 43. The other end of the spring 43 is connected with a screw 44 mounted in the bar 21. The end of the spring is held against the head of the screw by the nut 45. The spring 43 is of the tension type and operates to urge the roller r–1 toward the knife edge k–1. Preferably the spring is light wound so as to exert a substantially constant pull over the particular operating range of the instrument.

The above-described arrangement provides for the instrument to be used with various size specimens. For example, where a specimen is considerably smaller than that shown in Figure 1, one of the central apertures 42 may be fitted over the stud 36 so as to bring the roller closer to the knife edge. For any particular size of specimen within the intended operating range of the instrument, the force exerted by the roller against the specimen, i. e., roller pressure, can be adjusted by appropriately positioning the adjusting plate 41 on the stud 36.

The manner in which the device operates will be explained following.

To secure the device on a test specimen the rollers of the clamping units are moved away from the respective knife edges by moving the lever arm toward the mounting bar. This may be easily accomplished by placing the forefinger on the portion 33 of the arm and the thumb on the underside of the bar. The instrument is disposed so that both of the knife edges are up against the specimen, and then the levers released so that the rollers move up to engage the specimen.

The position of the instrument for the start of a test is shown in Figure 1. In this position the gauge length, i. e., the distance along the specimen between the tips of the knife edges k–1 and k–2 is accurately set by means of the adjusting screw 17.

Ordinarily in a testing machine the top crosshead is movable and the bottom crosshead is fixed. Thus, the moving force is applied in the direction shown by the arrow A on the specimen S. During the elongation the top knife edge, for the most part, moves with or follows the elongation of the specimen so that the knife edges move relatively apart from one another. This relative motion is accommodated because the instrument, as a whole, pivots, so to speak, about the tip of the knife edge k–1. In Figure 3 the letter S' indicates that the specimen S has been somewhat elongated, the letters k–1' and k–2' indicate the relative position between the knife edges, and the numeral 6' indicates the corresponding position of the core.

The letter S" in Figure 3 indicates that the specimen S has been further elongated, the letters k–1" and k–2" indicate the relative position of the knife edges, and the numeral 6" indicates the further upward movement of the core.

As mentioned heretofore, the relative motion between the coils and the core of the transformer produces an electrical signal which is proportional to the elongation or strain.

During the elongation of the specimen, it will be noted that the axis rollers remain substantially in the same plane as the corresponding knife edges. This is an important feature, particularly on small-diametered specimens which are considerably elongated in a test because neither roller creates a moment and hence exerts no extraneous load.

In those instances where the specimen is not of a character so that the instrument can be wholly supported thereon, one end of a spring is attached to the support 11 by means of the aperture 46 and the other end of the spring secured to the movable crosshead.

From a theoretical standpoint, it is desirable or necessary to measure the elongation or strain along the axis of the specimen. Since the specimen is of finite diameter or width, this is somewhat difficult to do. In most testing work strain measurements are made by fixing the devices which follow the strain to one side of the specimen. This is commonly called a non-averaging type of measurement. The position of the knife edges k–1 and k–2 previously described was for non-averaging type measurement.

An averaging type of measurement can be obtained by reversing the positions of the roller and knife edge in one of the clamping units. For example, in clamping unit C–1 an adaptor mounting a roller can be secured to the mounting bar 21 to replace the knife edge k–1 and another adaptor (to replace the screw 35) carrying a knife edge can be secured to the leg 34. With one knife edge on one side of the specimen and the other knife edge on the opposite side of the specimen an average value of strain is obtained, i. e., a value of strain intermediate the theoretical true value and that obtained by the knife edges on one side of the specimen.

I claim:

1. An extensometer comprising: a housing; a sensing device including coil and core elements mounted in said housing; first clamping means secured to said housing and including a knife edge and a roller and spring means normally urging the knife edge toward the roller, and the axis of the roller and tip of the knife edge lying substantially in the same plane; and second clamping means pivotally connected to said housing and including a knife edge pivotally connected to one of said elements, a roller, and spring means normally urging the second knife edge toward the second roller and the axis of the second roller and the tip of the second knife edge lying substantially in the same plane.

2. An extensometer comprising: a housing; a sensing device including coil and core elements mounted in said housing; a first clamp secured to said housing and extending outwardly therefrom, the clamp being adapted to be secured to a test specimen and including a knife edge and a roller and spring means normally urging the knife edge toward the roller, the axis of the roller and the tip of the knife edge lying substantially in the same plane; a support extending from said housing; a second clamp pivotally connected to said support and extending outwardly therefrom in the same direction as first said clamp, the clamp being adapted to be secured to a test specimen and including a knife edge and a roller and spring means normally urging the knife edge toward the roller, the axis of the roller and the tip of the knife edge lying substantially in the same plane; and pivotal interconnections between said second clamp and one of said elements providing for movement of the element with movement of the clamp.

3. A construction in accordance with claim 2 wherein said sensing element is a differential transformer and the coil element thereof is fixed to said housing and the core element thereof is connected to said second clamp.

4. An extensometer comprising: a housing; a sensing device including coil and core elements disposed in said housing; first clamp means including a mounting bar fixed to said housing, the mounting bar carrying a knife edge adapted to abut a test specimen, a lever arm pivotally connected to said bar and carrying a roller mounted in face-to-face relationship with said knife edge, and spring means interconnected between said lever arm and said bar and normally urging said roller toward said knife edge; and second clamping means including a second mounting bar pivotally connected with said housing and pivotally connected with said core element, the second mounting bar carrying a second knife edge, a second lever arm pivotally connected to said second mounting bar and carrying a second roller mounted in face-to-face relationship with said second knife edge, and second spring means interconnected with said second bar and normally urging said second roller toward said second knife edge.

5. A construction in accordance with claim 4 wherein each said lever arm is generally L-shaped and the respective means interconnecting the lever arms and mounting bars include respectively mechanism for adjusting the spring tension.

6. An extensometer comprising: a housing; a sensing device including coil and core elements mounted in said housing; a first clamp including a mounting bar fixed on said housing and extending outwardly generally at right angles thereto, a knife edge adjustably mounted on said mounting bar, a bracket mounted on said mounting bar and extending outwardly therefrom, an L-shaped lever arm pivotally secured to said bracket, a roller mounted on one leg of the lever arm and disposed normally in face-to-face relationship with said knife edge, a stud extending from said one leg, an adjusting plate having a plurality of apertures each adapted to fit over said stud, one of the apertures being engaged with the stud, a spring interconnected between said mounting bar and said adjusting plate; a support secured to and extending away from said housing; and a second clamp including a second mounting bar pivotally connected to said support and extending generally outwardly in the same direction as said first mounting bar, a pivotal connection between said second mounting bar and one of said elements, a second knife edge adjustably mounted on said second mounting bar, a second bracket mounted on said second bar and extending outwardly therefrom, a second L-shaped lever arm pivotally secured to said second bracket, a second roller mounted on one leg of said second lever arm and disposed normally in face-to-face relationship with said second knife edge, a second stud extending from last said one leg, a second adjusting plate having a plurality of apertures each adapted to fit over said second stud, one of the apertures being engaged with the stud, and second spring means interconnected between said second mounting bar and said second adjusting plate.

References Cited in the file of this patent

UNITED STATES PATENTS

| | | |
|---|---|---|
| 2,578,066 | Hyde | Dec. 11, 1951 |

FOREIGN PATENTS

| | | |
|---|---|---|
| 289,203 | Great Britain | Apr. 26, 1928 |